US009845416B1

(12) United States Patent
Vacca et al.

(10) Patent No.: US 9,845,416 B1
(45) Date of Patent: Dec. 19, 2017

(54) CURABLE ADHESIVE COMPOSITIONS FOR FLEXIBLE SUBSTRATES

(71) Applicant: SAES GETTERS S.P.A., Lainate (IT)

(72) Inventors: Paolo Vacca, Milan (IT); Marco Mudu, Rho (IT); Jiabril Gigli, Legnano (IT)

(73) Assignee: SAES GETTERS S.P.A., Lainate (MI) (IT)

( * ) Notice: Subject to any disclaimer, the term of this patent is extended or adjusted under 35 U.S.C. 154(b) by 0 days.

(21) Appl. No.: 15/524,613

(22) PCT Filed: Oct. 14, 2016

(86) PCT No.: PCT/EP2016/074800
§ 371 (c)(1),
(2) Date: May 4, 2017

(87) PCT Pub. No.: WO2017/067865
PCT Pub. Date: Apr. 27, 2017

(30) Foreign Application Priority Data

Oct. 19, 2015 (IT) ........................ 102015000062578

(51) Int. Cl.
C08F 2/46 (2006.01)
C08F 2/50 (2006.01)
C08G 61/04 (2006.01)
C09J 163/00 (2006.01)
C09J 11/08 (2006.01)

(52) U.S. Cl.
CPC ............. C09J 163/00 (2013.01); C09J 11/08 (2013.01)

(58) Field of Classification Search
USPC ................. 522/31, 6, 71, 189, 184, 1; 520/1
See application file for complete search history.

(56) References Cited

U.S. PATENT DOCUMENTS

| 5,596,024 A | 1/1997 | Horie et al. |
| 5,854,325 A | 12/1998 | Hosomi et al. |
| 2006/0079645 A1* | 4/2006 | Hasegawa ............... C08L 43/04 525/191 |
| 2006/0211821 A1* | 9/2006 | Ueda .................. C08G 65/2663 525/101 |
| 2008/0096016 A1* | 4/2008 | Tsurumi ................. H05K 3/387 428/344 |
| 2009/0192265 A1* | 7/2009 | Hasegawa ............... C08L 43/04 525/101 |
| 2010/0105795 A1* | 4/2010 | Maandi ............. C08F 222/1006 522/48 |
| 2010/0227949 A1* | 9/2010 | Tamai ................... C08F 299/00 523/400 |
| 2011/0256342 A1* | 10/2011 | Toshioka ............. C09J 133/068 428/119 |
| 2017/0154866 A1* | 6/2017 | Fathi ....................... H01L 24/83 |

FOREIGN PATENT DOCUMENTS

| EP | 1273644 A1 | 1/2003 |
| EP | 2377903 A1 | 10/2011 |
| JP | H10330717 A | 12/1998 |
| KR | 100827057 B1 | 5/2008 |
| WO | 9513315 A1 | 5/1995 |
| WO | 02055625 A1 | 7/2002 |
| WO | 2010019539 A2 | 2/2010 |
| WO | 2013142751 A2 | 9/2013 |

OTHER PUBLICATIONS

International Search Report for PCT/EP2016/074800 filed May 5, 2016 on behalf of SAES GETTERS S.P.A. dated Feb. 9, 2017. 4 pages.
Written Opinion for PCT/EP2016/074800 filed May 5, 2016 on behalf of SAES GETTERS S.P.A. dated Feb. 9, 2017. 5 pages.

* cited by examiner

Primary Examiner — Jessica Whiteley
(74) Attorney, Agent, or Firm — Steinfl + Bruno LLP

(57) ABSTRACT

A thermally or photo curable adhesive composition containing a bisphenol F epoxy resin and a bisphenol A epoxy resin in a ratio between 2 and 10. The composition further contains at least one epoxy acrylate component and a rubber modified bisphenol. The adhesive composition is applicable by a melt or liquid coating technique and undergoes curing upon exposure to heat or radiation, showing improved viscoelastic properties and suitable to provide a cured product having superior durability.

15 Claims, No Drawings

CURABLE ADHESIVE COMPOSITIONS FOR FLEXIBLE SUBSTRATES

CROSS-REFERENCE TO RELATED APPLICATIONS

The present application is the U.S. National Stage of International Patent Application No. PCT/EP2016/074800 filed on Oct. 14, 2016 which, in turn, claims priority to Italian Patent Application No. 102015000062578 filed on Oct. 19, 2015.

The present invention relates to thermally or photo curable adhesive compositions that are applicable by a melt or liquid coating technique and undergoes curing upon exposure to a heat or radiation, and more particularly to adhesive compositions with improved viscoelastic properties and suitable to provide a cured product having superior durability.

STATE OF THE ART

Adhesives have been widely used to bond various elements for their solvent-free nature and excellence in environmental resistance. For example, various types of curable adhesive compositions have been proposed to be applied by melt or liquid coating and subsequent curing by irradiation or heat in order to exhibit high bond strength. Many adhesive technologies can be formulated into composition suitable to be used as sealants, i.e. adopted to fill the gap between substrates and joints them.

Among such compositions, a large number of curable adhesives is based on a ring-opening reaction of an epoxy resin, i.e. these curable adhesive compositions obtain a high bond strength through a ring-opening polymerization of an epoxy group. Up to now, the selection of the specific epoxy compound and the inclusion of a phenol-containing compound has been attempted to achieve improvements in bond strength or heat resistance after cure. Adherends are bonded together by these curable hot-melt or liquid adhesives subsequently submitted to a curing treatment, based on exposure to heat or radiation.

Generally, in the case a photoreactive composition is selected (i.e. containing a cationic photoinitiator), it is not required that the cationically curable adhesive is irradiated continually until it is fully cured. In fact, once such an adhesive is irradiated, curing reaction in which radiation-generated cationic active species participate goes ahead even when this irradiation is stopped. If the mechanism of polymerization is well understood, a cationically photoreactive hot-melt or liquid adhesive may be used also when adherends are laminated by the adhesive and they prevent passage of a radiation, e.g., when they are opaque adherends. In order to extend the pot life of the adhesive composition, a component commonly called "cure retarder" is generally incorporated in the cationically photoreactive adhesive.

In the International patent application WO9513315, an epoxy/polyester based hot-melt composition which contains polyester that assumes a solid form at ordinary temperature, an epoxy resin and a cationic photoinitiator is disclosed. Due to the incorporation of the polyester that assumes a solid form at ordinary temperature, that adhesive revealed high strength immediately after lamination, eliminating the need of a clamping or other provisional fixing operation before curing completes. However, in the case where the composition excludes the solid polyester and incorporates the solid epoxy resin, the photoinitiator and optionally a low molecular weight hydroxyl-containing material, it is described to reveal low strength immediately after lamination.

The Japanese patent application JPH10330717 discloses a photoreactive adhesive composition comprising Bisphenol A type epoxy resin, polytetramethylene glycol and a cationic polymerization initiator. "Bisphenols" indicates a group of chemical compounds with two hydrophenyl functionalities and most of them are based on diphenylmethane. Bisphenol A (systematic name 2,2-bis(4-hydroxyphenyl)propane) is the most popular representative of this group. JPH10330717 further discloses Bisphenol F type epoxy resin as a suitable alternative to Bisphenol A type epoxy resin, suggesting to a replacement between them as excluding alternatives (i.e. using only Bisphenol A type or only Bisphenol F type as epoxy component) or as equivalent alternatives (i.e. using a different ratio between Bisphenol A and Bisphenol F to obtain a prefixed amount of the epoxy component without effect to the properties of the adhesive composition or the consequent cured material). For example, a photoreactive adhesive formulation where in combination of 2 parts by weight of a liquid epoxy resin, 4 parts by weight of polytetramethylene ether glycol and 0.8 parts by weight of cationic photoinitiator, 15 parts by weight of bisphenol A epoxy resin and 10 parts by weight of bisphenol A epoxy resin have been replaced by 15 parts by weight of bisphenol F epoxy resin and 10 parts by weight of bisphenol F epoxy resin (without any significant effect on dry adhesion and chemical resistance The International patent application WO02055625 discloses a photoreactive hot-melt adhesive composition which contains a bisphenol F epoxy resin, a cationic photoinitiator and a compound preferably selected between a copolymer of tetramethylene oxide and ethylene oxide or a copolymer of tetramethylene oxide and propylene oxide. WO02055625 moreover describes the possibility that bisphenol F is mixed to Bisphenol A in the epoxy component of the adhesive if their respective weight ratio is at least 12.5, teaching that the replacement of bisphenol F with bisphenol A exhibits some drawbacks, as for example an insufficient resistance against hydrophilic liquids. Moreover, a strong increasing in glass transition temperature and viscosity characterize the compositions disclosed in WO02055625.

Unlike the above prior-art document, the European patent application EP2377903 discloses an adhesive composition wherein bisphenol A is present as main epoxy resin in combination with bisphenol F in order to balance some film adhesive properties, as its strength and the connection resistance. EP2377903, anyway, is silent about how modify those compositions to improve many other adhesive properties, as for example its flexibility after the film formation obtained by solvent evaporation.

The U.S. Pat. Nos. 5,596,024 and 5,854,325 disclose photo-polymerisable epoxy adhesive compositions wherein epoxy acrylate components are used in association to an epoxy resin in order to achieve an excellent preservative stability without giving rise to failure under hot and humid conditions, but it is silent on how said composition should be modified and provide high adhesive strength immediately after their application and have excellent flexibility and durability after curing. In particular U.S. Pat. No. 5,854,325 discloses compositions mainly based on the use of bisphenol A or, as alternative, bisphenol F epoxy resins.

DESCRIPTION OF THE INVENTION

It is an object of the present invention to provide a curable adhesive composition which is readily applicable to an adherend, completes curing soon after irradiation or thermal exposure, reveals high adhesive strength immediately after lamination, without requiring a long period of aging, and moreover which exhibits excellent flexibility and durability after curing.

In accordance with a broad aspect of the present invention, a curable adhesive composition is provided containing a bisphenol F epoxy resin and a bisphenol A epoxy resin in a weight ratio that is comprised between 2 and 10 and further containing at least one epoxy acrylate component in association with at least one rubber modified bisphenol, such as a rubber modified epoxy resin. Rubber modified bisphenols are epoxy resins where rubber chains are covalently linked to the bisphenol unit. These components are generally obtained through the reaction of reactive group at the chain ends of rubber copolymer, copolymer that displays rubber-like elasticity, and epoxy groups. Typical adopted reactive group at the chain ends are carboxylic acid or amine groups and the adopted rubbers usually are copolymers of butadiene and acrylonitrile. In a preferred embodiment of the present invention, the curable adhesive composition is provided containing a bisphenol F epoxy resin and a bisphenol A epoxy resin in a weight ratio that is comprised between 4 and 8.

As effect of the inclusion of the bisphenol F epoxy resin as a reactive component, the curable adhesive composition in accordance with the present invention can provide a cured product with improved such physical properties as toughness, durable adhesion and flexibility but only if said bisphenol is used is in association with a corresponding amount of bisphenol A epoxy resin as above disclosed, with at least one rubber modified epoxy resin and with at least one epoxy acrylate component. Rubber modified epoxy resins deriving from the family of copolymers of butadiene and acrylonitrile are particularly preferred for the formulation of compositions according to the present invention. Carboxyl-terminated butadiene-acrylonitrile resins can be also adopted.

In said first particular aspect of the invention, the curable adhesive composition contains the rubber modified epoxy resin component in the amount of 1-10 parts by weight, based on 100 parts by weight of all the curable adhesive composition. This rubber modified epoxy resin component may be selected from Epikote 03161 manufactured by Hexion, KR-208 and KR-309 manufactured by Kukdo Chemical (Kunshan) co. LTD., EPR 2000 manufactured by Adeka Corporation.

As effect of the inclusion of the rubber-modified epoxy resin as a reactive component, the curable adhesive composition in accordance with the present invention can provide a cured product with improved reactivity but only if said rubber-modified epoxy resin is used in association with a corresponding amount of bisphenol A and bisphenol F epoxy resins and with at least one epoxy acrylate component. In fact, even if the use of rubber-modified epoxy resin in association with bisphenol epoxy resin has been disclosed, for example, by the International patent application WO 2013142751 in order to allow the adduct to further react when the adhesive is cured, adhesion before curing as well final flexibility and durability can be obtained only when adhesive composition fails into the present invention, i.e. it additionally comprises epoxy acrylate component and bisphenol A and bisphenol F are present in a corresponding ratio.

In particular, the curable adhesive composition contains the epoxy acrylate component in the amount of 1-5 parts by weight, based on 100 parts by weight of all the curable adhesive composition. This epoxy acrylate component is a reactive monomer where acrylic functionalities are combined to glycidyl functional groups or bisphenol unit: for example it may be selected from glycidyl acrylate, glycidyl methacrylate, bisphenol A diacrylate, bisphenol F diacrylate. Epoxy acrylates components are generally used in combination with multifunctional monomers like trimethylolpropane trimethacrylate, trimethylolpropane triacrylate to increase the curing rate. In a particular embodiment of formulations according to the present invention a blend of glycidyl acrylate and trimethylolpropane triacrylate can be adopted.

The type of the bisphenol F epoxy resin is not particularly binding. For example, bisphenol F epoxy resins having average molecular weights in the approximate range of 300-10,000 gr/mol can be suitably used. Specific examples thereof include those sold under the names of EPICOAT 4004P and EPICOAT 4010P and manufactured by Yuka-Shell Epoxy Co., Ltd. Other type of suitable bisphenol F can be a liquid epoxy resin having number average molecular weights lower than 700 gr/mol as for example that sold under the name Epon Resin 862 and manufactured by Hexion. The bisphenol F epoxy resin undergoes ring-opening polymerization when the cationic photoinitiator is activated by irradiation and imparts excellent bond strength to the photoreactive hot-melt adhesive composition in accordance with the present invention. This is probably because the methylene bridge in bisphenol F epoxy resin allows an easier skeleton rotation making it more flexible and thus provides a cured product which shows improved stress relaxation, compared to the bisphenol A epoxy resin. Because of the missing methyl groups, the viscosity of bisphenol F resins is typically lower than that of bisphenol A. Also, the bisphenol F epoxy resin acts to increase the resistance of the cured product to water and other hydrophilic liquids, when reacted with the epoxy acrylate component. At the same time, the bisphenol A epoxy resin is particularly useful for its ability to impart improved resistance against hydrophilic liquids to a bonded laminate. The type of the bisphenol A epoxy resin is not particularly binding. For example, unmodified bisphenol A epoxy resins having average molecular weights lower than 1000 gr/mol can be suitably used. Specific examples thereof include those sold under the names of Epon 828 manufactured by Hexion, D.E.R. 332 manufactured by DOW Chemical, Araldite GY 6010 manufactured by Huntsman.

Although its molecular weight is not particularly binding, a thermoplastic filler can be advantageously added to the composition according to the present invention. It can be selected from poly(methyl methacrylate-co-ethylene glycol dimethacrylate), poly(methyl methacrylate-co-ethyl acrylate), poly(styrene-co-divinylbenzene), polymethysilsesquioxane and it preferably has a weight average molecular weight of 1,000 gr/mol or higher for its ability to improve heat-resistant adhesion. Preferably, the particle size of the thermoplastic filler is smaller than 20 um and the amount of the thermoplastic filler incorporated is within the range of 1-8 parts by weight, based on 100 parts by weight corresponding to the total weight of the composition according to the present invention. If compared to bisphenol F based composition in the state of the art, this concentration of thermoplastic filler can be lowered up to be significantly less than 10% by weight of the compositions and this can be useful to minimize its jeopardizing impact on the barrier properties.

In the present invention, in the case of a thermally adhesive composition, any curing agent can be suitably used as thermal initiator, so long as it is activated by exposure to heat to cause ring-opening polymerization of the epoxy resin. Preferred examples of amine curing agent are ethylenediamine, trimethylhexamethylendiamine, diethylenetriamine, 2-hydroxyethyl diethylenetriamine, dipropylenetriamine, triethylenetetramine, tetraethyl enepentamine, diproprenediamine, diethylaminopropylamine, dimethylaminopropylamine, m-xylylenediamine, N-aminoethylpiperazine, methane diamine, isophoronediamine, cyclohexylpropylenediamine. Preferred examples of anhydride curing agent are methyltetrahydrophtalic anhydride, methyl endomethylenetetrahydrophthalic anhydride, methylhexahydrophthalic anhydride, dodecenylsuccinic anhydride. Curing agents react with glycidyl resins slowly at room temperature, but higher temperatures induce a faster curing mechanism. Moreover, curing agents can be also adopted like latent hardener in formulating single-component thermally curable epoxy resins. Preferred examples of latent hardener are dicyandiamide and organic-acid hydrazide. In particular, dicyandiamide is normally used in the form of fine powder or modified particles dispersed in the resin ensuring a very long pot life.

In the case of thermally adhesive composition, the loading of the curing agent is optimal when the number of active hydrogen is equal to that of moles in epoxy groups. Generally for 25 parts of an epoxy resin with equivalent number of 200 g/eq, 25-50 parts by weight have to be adopted for a curing agent with 200-100 number of active hydrogen, based on 100 parts by weight of the overall composition weight, allowing a complete polymerization of the adhesive composition with thermal treatment at temperature in the range between 70-120° C. for a time between 60 and 20 minutes.

In the present invention, in the case of a photocurable adhesive composition, any cationic photoinitiator can be suitably used, so long as it is activated by exposure to radiation to cause ring-opening polymerization of the epoxy resin. Examples of cationic photoinitiators include sulfonium salts, iodonium salts, onium. Preferred among such cationic photoinitiators are antimonium salts and triarylsulfonium hexafluoroantimonate salts have been found to be particularly useful to the present invention. As alternative, cationic photoinitiator can be chosen among triphenylsulfonium salts, methyldiphenylsulfonium salts, dimethylphenylsulfonium salts, diphenylnaphthylsulfonium salts and di(methoxynaphthyl)methylsulfonium salts. Preferred among such aromatic sulfonium salts are aromatic sulfonium salts with hexafluorophosphate ions (PF6<->) as counter ions as, for example, triphenylsulfonium hexafluorophosphate, methyldiphenylsulfonium hexafluorophosphate, dimethylphenylsulfonium hexafluorophosphate, diphenylnaphthylsulfonium hexafluorophosphate and di(methoxynaphthyl)methylsulfonium hexafluorophosphate.

In the case of a photocurable adhesive applied on plastic substrates and a curing process promoted through a layer where UV blockers or light stabilizers are adopted, photoinitiator mixture with light absorption in the long wavelength UV region or in visible range can be suitably used. Examples of fluorone dyes are 2,4,5,7-Tetraiodo-3-hydroxy-6-fluorone, 5,7-diiodo-3-butoxy-6-fluorone, also adopted in combination with Iodonium salt or other coinitiators.

The amount of the cationic photoinitiator may be varied depending upon the type and intensity of the radiation, the types and amounts of the epoxy resins, the type of the cationic photoinitiator used and the like. Preferably, the cationic photoinitiator is incorporated in the amount of 0.05-10 parts by weight, based on 100 parts by weight of the overall composition weight.

The type of the radiation used to cure the composition is not particularly specified if it can cause the cationic photoinitiator to generate cations, and can be suitably chosen depending on the type of the cationic photoinitiator used.

The applicable radiation may be in the ultraviolet range or in visible range. Particularly in the case where a triarylsulfonium hexafluoroantimonate salt is used as the cationic photoinitiator, the radiation preferably includes a wavelength of 350-400 nm. Particularly in the case where a fluorone dye is used as the cationic photoinitiator, the radiation preferably includes a wavelength of 400-550 nm. The energy exposure cannot be readily determined because it is varied depending on the type of the cationic photoinitiator used and the thickness and spread of the photoreactive hot-melt adhesive composition coated on an adherend, but may preferably be in the range of 0.001 J-15 J. The exposure time cannot be specified in a wholesale manner because it is varied depending on the intensity of the radiation, the type of the epoxy resin used and the like, but is generally sufficient if within the range of 1-120 seconds. When the adhesive is coated in a relatively thick manner, the exposure time may preferably be extended beyond the above-specified range.

The adhesive composition in accordance with the present invention may further contain other components, if necessary, within the range that does not impede the purposes of the present invention. Examples of such components include adhesion improvers, sensitizers, dehydrating agents, antioxidants, stabilizers, plasticizers, waxes, fillers, spacers, flame retardants, blowing agents, antistatic agents, fungicides, viscosity control agents and the like. Applicable components are not limited to those listed above. Any combination of the above-listed components may be added.

The type of the adherend to which the adhesive composition in accordance with the present invention is applied is not particularly limited. Plastic adherends can be suitably used, including those made from polyester resins such as polyethylene terephthalate, polycarbonate and polyallylate; acrylic resins; and the like. The photoreactive hot-melt adhesive composition in accordance with the present invention can also be applied to adherends made from a wide range of materials including plastics as polycarbonate, polyimide, polyetherimide other than polyethylene terephthalate and polyethylene naphthalate, rubbers such as ethylene propylene rubber; metals such as iron and aluminum and alloys; cellulosic materials such as wood and paper; leathers; and the like.

The present invention will be further explained by the following non-limiting examples.

Example 1

77.5 parts by weight of a liquid bisphenol F epoxy resin, 8.7 parts by weight of a liquid bisphenol A epoxy resin, 8.7 parts by weight of poly (acrylonitrile-co-butadiene) modified bisphenol resin, 1 part by weight of a blend of glycidyl acrylate and trimethylolpropane triacrylate, 4.5 parts by weight of poly(methyl methacrylate-co-ethylene glycol dimethacrylate), 4.5 parts by weight of triphenylsulfonium salts are mixed together in a kneading machine to obtain a photoreactive adhesive composition.

The obtained liquid material has been cured by applying an irradiance of 100 mW/cm2 for 120 s with λ=365 nm

Example 2

72.5 parts by weight of a liquid bisphenol F epoxy resin, 11.2 parts by weight of a liquid bisphenol A epoxy resin, 6.2 parts by weight of poly (acrylonitrile-co-butadiene) modified bisphenol resin, 5 parts by weight of a blend of glycidyl acrylate and trimethylolpropane triacrylate, 4.5 parts by weight of poly(methyl methacrylate-co-ethylene glycol dimethacrylate), 4.5 parts by weight of triphenylsulfonium salts are mixed together in a kneading machine to obtain a photoreactive adhesive composition.

The obtained liquid material has been cured by applying an irradiance of 100 mW/cm2 for 120 s with λ=365 nm

Example 3

72.5 parts by weight of a liquid bisphenol F epoxy resin, 11.2 parts by weight of a liquid bisphenol A epoxy resin, 6.2 parts by weight of poly (acrylonitrile-co-butadiene) modified bisphenol resin, 5 parts by weight of a blend of glycidyl acrylate and trimethylolpropane triacrylate, 4.5 parts by weight of poly(methyl methacrylate-co-ethylene glycol dimethacrylate), 21 parts by weight of dicyandiamide are mixed together in a kneading machine to obtain a thermally curable reactive adhesive composition The obtained liquid material has been cured by applying a heating process at 100° C. for 30 min.

Example 4

72.5 parts by weight of a liquid bisphenol F epoxy resin, 11.2 parts by weight of a liquid bisphenol A epoxy resin, 6.2 parts by weight of poly (acrylonitrile-co-butadiene) modified bisphenol resin, 5 parts by weight of a blend of glycidyl acrylate and trimethylolpropane triacrylate, 4.5 parts by weight of poly(methyl methacrylate-co-ethylene glycol dimethacrylate), 0.5 parts by weight of 2,4,5,7-Tetraiodo-3-hydroxy-6-fluorone, 2.5 parts by weight of Iodonium salt are mixed together in a kneading machine to obtain a photoreactive adhesive composition.

The obtained liquid material has been cured by applying an irradiance of 100 mW/cm2 for 120 s with λ=530 nm

Example 5 (Comparative: Weight Ratio Out of Range)

82.5 parts by weight of a liquid bisphenol F epoxy resin, 6.2 parts by weight of a liquid bisphenol A epoxy resin, 8.7 parts by weight of poly (acrylonitrile-co-butadiene) modified bisphenol resin, 1 part by weight of a blend of glycidyl acrylate and trimethylolpropane triacrylate, 4.5 parts by weight of poly(methyl methacrylate-co-ethylene glycol dimethacrylate), 4.5 parts by weight of triphenylsulfonium salts are mixed together in a kneading machine to obtain a photoreactive adhesive composition.

The obtained liquid material has been cured by applying an irradiance of 100 mW/cm2 for 120 s with λ=365 nm

Example 6 (Comparative: Lacking Rubber Modified Epoxy Resin)

72.5 parts by weight of a liquid bisphenol F epoxy resin, 11.2 parts by weight of a liquid bisphenol A epoxy resin, 5 parts by weight of a blend of glycidyl acrylate and trimethylolpropane triacrylate, 4.5 parts by weight of poly(methyl methacrylate-co-ethylene glycol dimethacrylate), 4.5 parts by weight of triphenylsulfonium salts are mixed together in a kneading machine to obtain a photoreactive adhesive composition.

The obtained liquid material has been cured by applying an irradiance of 100 mW/cm2 for 120 s with λ=365 nm

Example 7 (Comparative: Epoxy Acrylate Replaced by Aliphatic Acrylate)

77.5 parts by weight of a liquid bisphenol F epoxy resin, 8.7 parts by weight of a liquid bisphenol A epoxy resin, 10 parts by weight of aliphatic monoglycidyl ether of C12/C14-fatty alcohol, 1 part by weight of a blend of glycidyl acrylate and trimethylolpropane triacrylate, 4.5 parts by weight of poly(methyl methacrylate-co-ethylene glycol dimethacrylate), 4.5 parts by weight of triphenylsulfonium salts are mixed together in a kneading machine to obtain a photoreactive adhesive composition.

The obtained liquid material has been cured by applying an irradiance of 100 mW/cm2 for 120 s with λ=365 nm

Example 8 (Comparison Between the Compositions of Examples 1 to 7)

In order to determine the transition from a mechanical solid phase to a viscoelastic phase, the prepared liquid samples have been submitted to calorimetric analysis. Differential Scanning Calorimetry has been performed by means of a DSC 204 F1 Phoenix equipment from Netzsch and connected to a Omnicure 2000 light source and to a compressor cooling device. 20 mg of liquid samples have been cured in aluminum crucibles and then submitted to a heating scan at 10° C./min in the range −50° C.-200° C. The glass transition range has been determined by considering the onset and the endpoint of the inflection portion.

| Formulation | Bis F/ Bis A | Glass transition range (Tg)* [° C.] |
| --- | --- | --- |
| Example 1 | 8.9 | −5-13 |
| Example 2 | 6.5 | 0-20 |
| Example 3 | 6.5 | 10-25 |
| Example 4 | 6.5 | 0-20 |
| Example 5 | 13.3 | 90-100 |
| Example 6 | 6.5 | 125-140 |
| Example 7 | 8.9 | 60-80 |

The invention claimed is:

1. A curable adhesive composition containing a bisphenol F epoxy resin, a bisphenol A epoxy resin and at least one epoxy acrylate component, wherein the weight ratio of bisphenol F with respect to bisphenol A is comprised between 4 and 8 and wherein said composition further contains a rubber modified epoxy resin.

2. The curable composition according to claim 1 wherein said bisphenol F is a liquid epoxy resin having number average molecular weights lower than 700 gr/mol.

3. The curable composition according to claim 1 wherein the weight ratio of said at least one epoxy acrylate component with respect to said at least one rubber modified epoxy resin is comprised between 0.1 and 1.

4. The curable composition according to claim 1 wherein said rubber modified epoxy resin is present in amount of 1 to 10 parts by weight, based on 100 parts by weight of the whole curable adhesive composition.

5. The curable composition according to claim 1 wherein said rubber modified epoxy resin contains at least one between butadiene and acrylonitrile.

6. The curable composition according to claim 1 wherein said epoxy acrylate component is present in amount of 1 to 5 parts by weight, based on 100 parts by weight of the whole curable adhesive composition.

7. The curable composition according to claim 1 wherein said at least one epoxy acrylate component is selected from glycidyl acrylate and glycidyl methacrylate.

8. The curable composition according to claim 1 wherein said composition further contains at least one thermoplastic filler.

9. The curable composition according to claim 8 wherein said at least one thermoplastic filler is selected from poly(methyl methacrylate-co-ethylene glycol dimethacrylate), poly(methyl methacrylate-co-ethyl acrylate), poly(styrene-co-divinylbenzene) and polymethysilsesquioxane.

10. The curable composition according to claim 1 wherein said composition further contains at least one thermal initiator.

11. The curable composition according to claim 10 wherein said at least one thermal initiator is selected from ethylenediamine, trimethylhexamethylendiamine, diethylenetriamine, 2-hydroxyethyldiethylenetriamine, dipropylenetriamine, triethylenetetramine, tetraethylenepentamine, diproprenediamine, diethylaminopropylamine, dimethylaminopropylamine, m-xylylenediamine, N-aminoethylpiperazine, methane diamine, isophoronediamine, cyclohexylpropylenediamine, Preferred examples of anhydride curing agent are methyltetrahydrophtalic anhydride, methyl endo-methylenetetrahydrophthalic anhydride, methylhexahydrophthalic anhydride and dodecenyl succinic anhydride.

12. The curable composition according to claim 1 wherein said composition further contains at least one UV photoinitiator.

13. The curable composition according to claim 12 wherein said at least one UV photoinitiator is selected from triphenylsulfonium salts, methyldiphenylsulfonium salts, dimethylphenylsulfonium salts, diphenylnaphthylsulfonium salts and di(methoxynaphthyl)methylsulfonium salts, triphenylsulfonium hexafluorophosphate, methyldiphenylsulfonium hexafluorophosphate, dimethylphenylsulfonium hexafluorophosphate, diphenylnaphthylsulfonium hexafluorophosphate and di(methoxynaphthyl)methylsulfonium hexafluorophosphate.

14. The curable composition according to claim 1 wherein said composition further contains at least one visible photoinitiator.

15. The curable composition according to claim 14 wherein said at least one visible photoinitiator is selected from 2,4,5,7-tetraiodo-3-hydroxy-6-fluorone and 5,7-diiodo-3-butoxy-6-fluorone.

* * * * *